(12) United States Patent
Herrmann et al.

(10) Patent No.: US 6,874,816 B2
(45) Date of Patent: Apr. 5, 2005

(54) CHASSIS FOR A COMMERCIAL VEHICLE AND METHOD OF MAKING AND USING SAME

(75) Inventors: Roland Herrmann, Altenriet (DE); Wolfgang Seidl, Marbach (DE)

(73) Assignee: DaimlerChrysler AG, Stuttgart (DE)

( * ) Notice: Subject to any disclaimer, the term of this patent is extended or adjusted under 35 U.S.C. 154(b) by 183 days.

(21) Appl. No.: 10/424,983

(22) Filed: Apr. 29, 2003

(65) Prior Publication Data

US 2003/0227165 A1 Dec. 11, 2003

(30) Foreign Application Priority Data

Apr. 30, 2002 (DE) .......................................... 102 19 275

(51) Int. Cl.[7] .............................................. B62D 21/00
(52) U.S. Cl. ...................................................... 280/781
(58) Field of Search ................................. 280/781, 785, 280/788, 795, 800, 797, 124.109; 180/311, 312

(56) References Cited

U.S. PATENT DOCUMENTS 6,398,262 B1 * 6/2002 Ziech et al. ................. 280/785
6,733,021 B1 * 5/2004 Ziech et al. ........... 280/124.109
6,736,232 B1 * 5/2004 Bergstrom et al. .......... 180/292

FOREIGN PATENT DOCUMENTS

| DE | 35 22 851 C3 | 7/1992 |
|---|---|---|
| DE | 198 09 196 A1 | 9/1999 |
| DE | 19958921 | 6/2000 |
| DE | 20022516 | 12/2001 |

* cited by examiner

Primary Examiner—Faye M. Fleming
(74) Attorney, Agent, or Firm—Crowell & Moring LLP

(57) ABSTRACT

A chassis for a commercial vehicle, in particular a lorry, having a front module which has, on each side of the vehicle, a longitudinal member part and having an axle module which is fastened to the outside of the longitudinal member parts on each side of the vehicle in each case in a first coupling zone of the longitudinal member parts. The axle module has, on each side of the vehicle, an individual wheel suspension. Each of two lower A-frame arms are mounted with its second limb in a second coupling zone of the respective longitudinal member part. Both the first coupling zones and the second coupling zones are designed for at least two coupling configurations. The coupling can figuration differ from one another with regard to the vertical ground clearance of the longitudinal member parts.

19 Claims, 3 Drawing Sheets

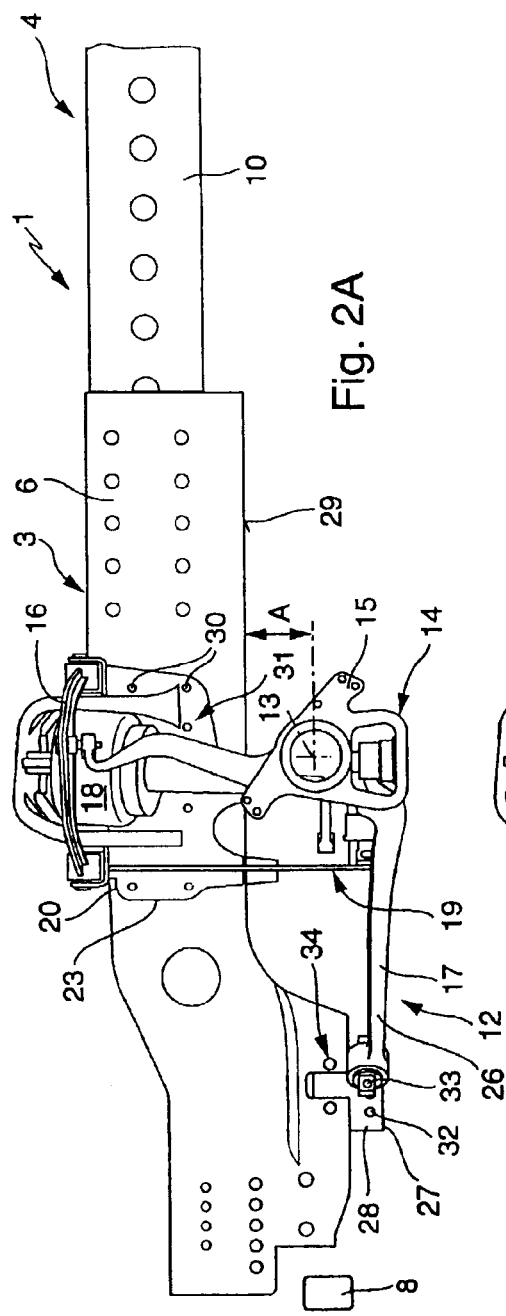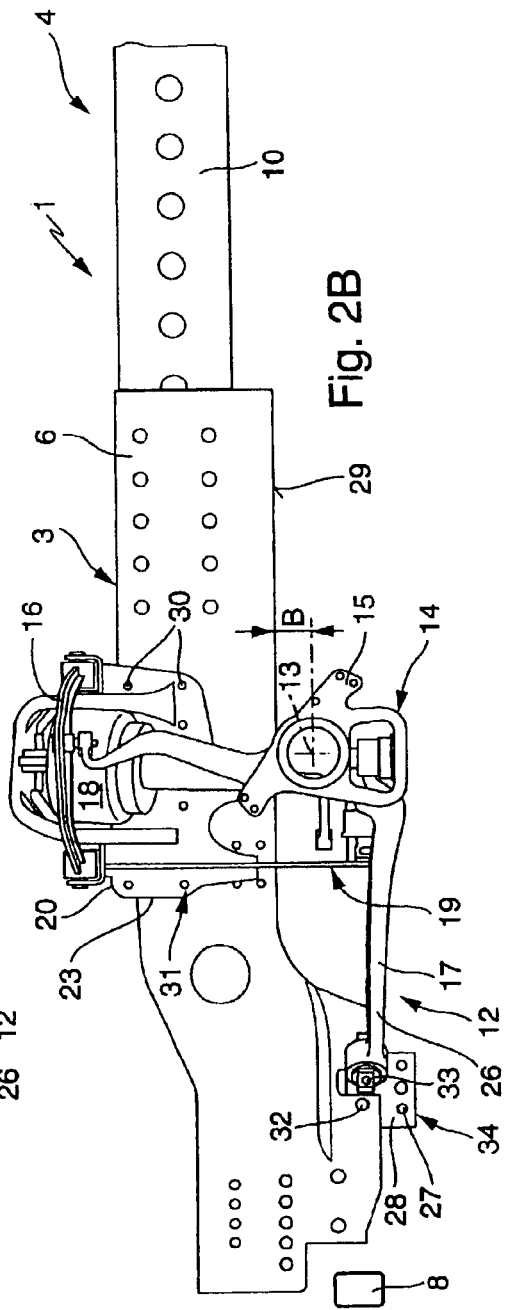

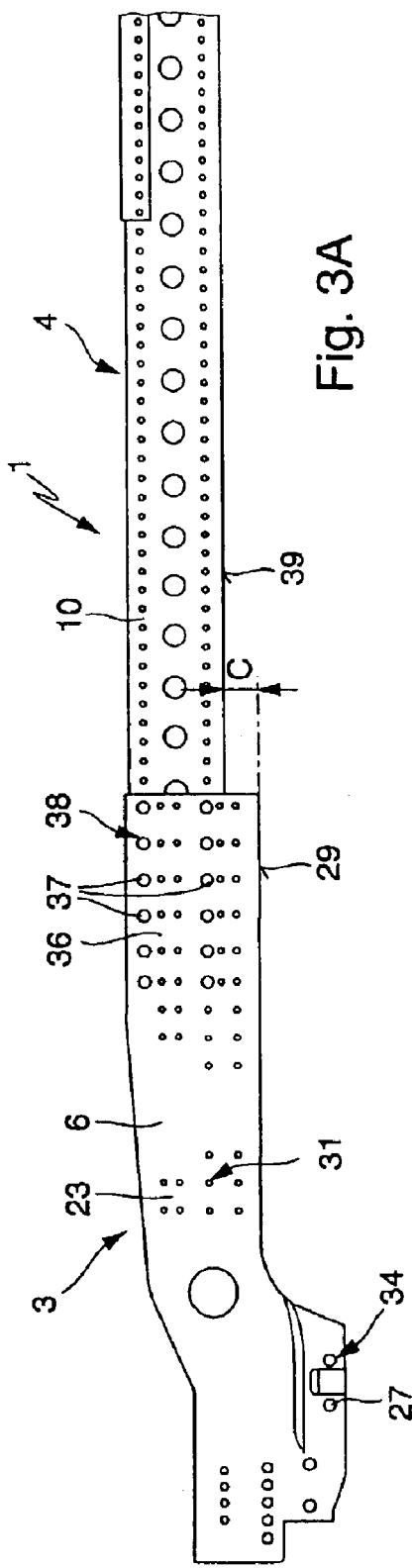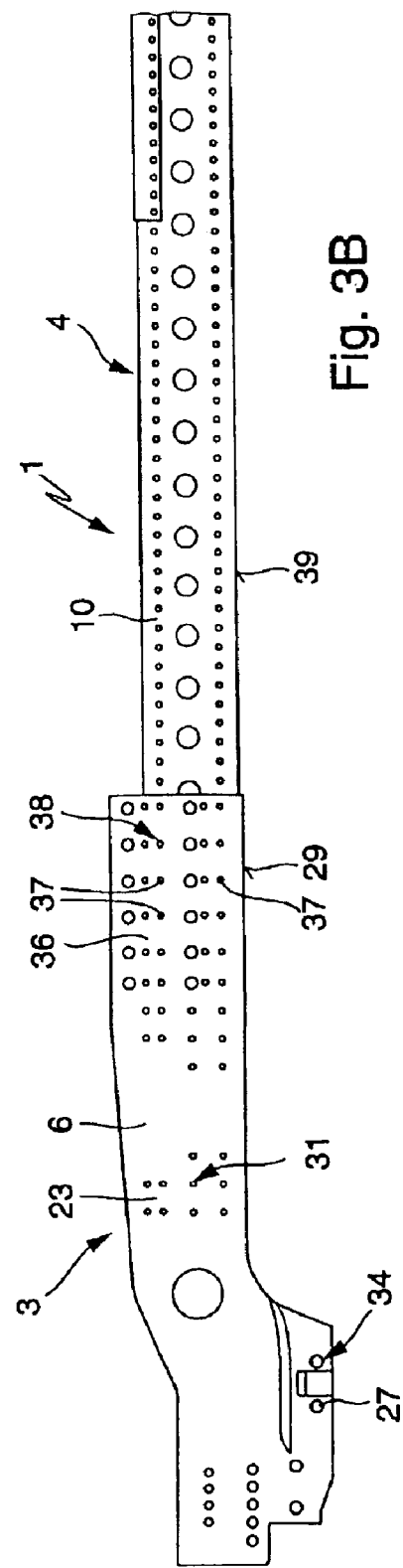

CHASSIS FOR A COMMERCIAL VEHICLE AND METHOD OF MAKING AND USING SAME

BACKGROUND AND SUMMARY OF THE INVENTION

This application claims the priority of German Patent Document No. 102 19 275.8-21, filed Apr. 30, 2002, the disclosure of which is expressly incorporated by reference herein.

The invention relates to a chassis for a commercial vehicle, in particular for a lorry.

In German Patent Document DE 198 09 196 A1 a chassis for a heavy-duty commercial vehicle is disclosed which has, on each side of the vehicle, a longitudinal member, which members can be connected to each other via a plurality of transverse members. An axle unit or an axle module for the mounting of a rigid axle is attached to the longitudinal members. The axle module has a U-shaped bracket which engages around the longitudinal members from below and from the outside and which is fastened by its U-limbs to the outside of the longitudinal members. The axle module also has, on each side of the vehicle, a longitudinal control arm, the arms in each case being mounted pivotably at one end on a bearing bracket fastened to the associated longitudinal member and being connected fixedly at the other end to a rigid axle body. Furthermore, a suspension/shock-absorber strut is arranged in each case on each side of the vehicle, the struts being supported in each case at one end on the rigid axle body and at the other end on an end, which is of yoke-shaped design, of the associated U-limb.

In German Patent Document DE 35 22 851 C3 and corresponding U.S. Pat. No. 4,694,483, a vehicle having an individual wheel suspension means is described, in which each individual wheel suspension means is provided with a pneumatically operating suspension strut. With a pneumatic suspension strut, the respective wheel is supported on the chassis via an air cushion or gas volume bounded, for example, by a bellows. In this case, the compressible gas enclosed in the gas volume forms the spring of the suspension strut. In the case of the known vehicle, the ground clearance of the vehicle can be enlarged or reduced in a specific manner by feeding air into or discharging air from the gas volume.

Differences in commercial vehicles include a distinction being made between road vehicles and construction-site vehicles which have, in particular, different overhang angles and ground clearances. The production of different types of commercial vehicles is associated with a relatively high outlay.

The present invention is concerned with the problem of specifying, for a chassis of the type mentioned at the beginning, an improved embodiment which, in particular, makes it easier to construct different types of commercial vehicle.

This problem may be solved according to certain preferred embodiments of the invention by the chassis having a front module which has, on each side of the vehicle, a longitudinal member part, the parts being connected to each other via at least one transverse member and being used for the mounting of an internal combustion engine and/or a driver's cab, having a axle module which has a U-shaped bracket which engages around the longitudinal member parts from below and from the outside and which is fastened by its U-limbs to the outside of the longitudinal member parts on each side of the vehicle in each case in a first coupling zone of the longitudinal member parts, the axle module having, on each side of the vehicle, an individual wheel suspension means, in which in each case one wheel carrier is mounted on the axle module via a lower A-frame arm and an upper A-frame arm, each lower A-frame arm being mounted with its first limb on a U-base of the bracket, which U-base connects the U-limbs to each other, and being mounted with its second limb on the longitudinal member part in a second coupling zone of the respective longitudinal member part, each upper A-frame arm being mounted with both of its limbs on one of the U-limbs of the bracket, both the first contact zones and the second contact zones being designed for at least two coupling configurations, in which the bracket can be attached in the first coupling zones and the second limbs of the lower A-frame arms can be attached in the second coupling zones, and which differ from one another with regard to the vertical ground clearance of the longitudinal member parts. Advantageous embodiments are contained in the dependent claims and herein.

Certain preferred embodiments of the invention are based on the general concept of preparing and designing a front module, to which the axle module is to be attached, in such a manner that at least two configurations which differ from one another with regard to the ground clearance of the front module are provided for the attachment of the axle module. In a first configuration, the axle module is attached to the front module in such a manner that a relatively low ground clearance is produced, with the result that the chassis provided with said configuration is suitable for the construction of a road vehicle or road roller. In contrast to this, in a second configuration, the axle module is attached to the front module in such a manner that a relatively high ground clearance is produced, with the result that the chassis is then particularly suitable for the construction of a construction-site vehicle. It is of particular importance here that the same axle module and the same front module can be used for the construction of the two different types of commercial vehicle, namely the road roller and construction-site vehicle, with the effect that all of the attachment parts on the axle module and/or on the front module can also be used in a virtually identical manner in both types of commercial vehicle. The advantages in terms of costs which can thereby be achieved are realized.

Certain preferred embodiments of the invention use an axle module provided with individual wheel suspension means, the individual wheel suspension means each having upper and lower A-frame arms. The lower A-frame arms are supported in each case with a first limb on a U-base of the bracket and with a second limb on the front module. In the region of this supporting or mounting of the second limbs of the lower A-frame arms, the front module, in one particular embodiment, can have a transverse supporting member which is positioned in such a manner that the second limbs of the lower A-frame arms are supported on one another transversely with respect to the longitudinal direction of the vehicle via these transverse supporting members. This measure results in particularly high rigidity, in particular torsional rigidity, for the axle module attached to the front module or for the entire front region of the chassis.

The front module has longitudinal member parts which are connected to each other via at least one transverse member and on which an internal combustion engine of the vehicle and/or a driver's cab can be mounted. The front module is adjoined to the rear by the commercial-vehicle body which conventionally has two body longitudinal members running parallel to the longitudinal direction of the vehicle. The longitudinal member parts of the front module are expediently prepared for the fastening of the body longitudinal members.

According to one particular development, the coupling zones of the longitudinal member parts, which zones are provided for the connection of the body longitudinal members, are designed and prepared for at least two coupling configurations, in which the body longitudinal members can be fastened in these coupling zones, and which differ from one another with regard to the vertical ground clearance of the body longitudinal members. In this embodiment, the basic concept of the invention is consequently continued, in order, also in the region of the vehicle body, to be able to provide different ground clearances for the different types of commercial vehicle.

Further important features and advantages of the invention emerge from the subclaims, from the drawings and from the associated description of the figures with reference to the drawings.

The features mentioned above and those which are explained below can be used not only in the respectively stated combination, but also in other combinations or on their own without departing from the scope of the present invention.

Other objects, advantages and novel features of the present invention will become apparent from the following detailed description of the invention when considered in conjunction with the accompanying drawings.

BRIEF DESCRIPTION OF THE DRAWINGS

FIGS. 2A and 2B show side views of the chassis according to FIG. 1 with different coupling configurations, and FIGS. 3A and 3B show simplified side views of the chassis according to FIG. 1 with two further coupling configurations.

DETAILED DESCRIPTION OF THE PREFERRED EMBODIMENT

Figure 1:
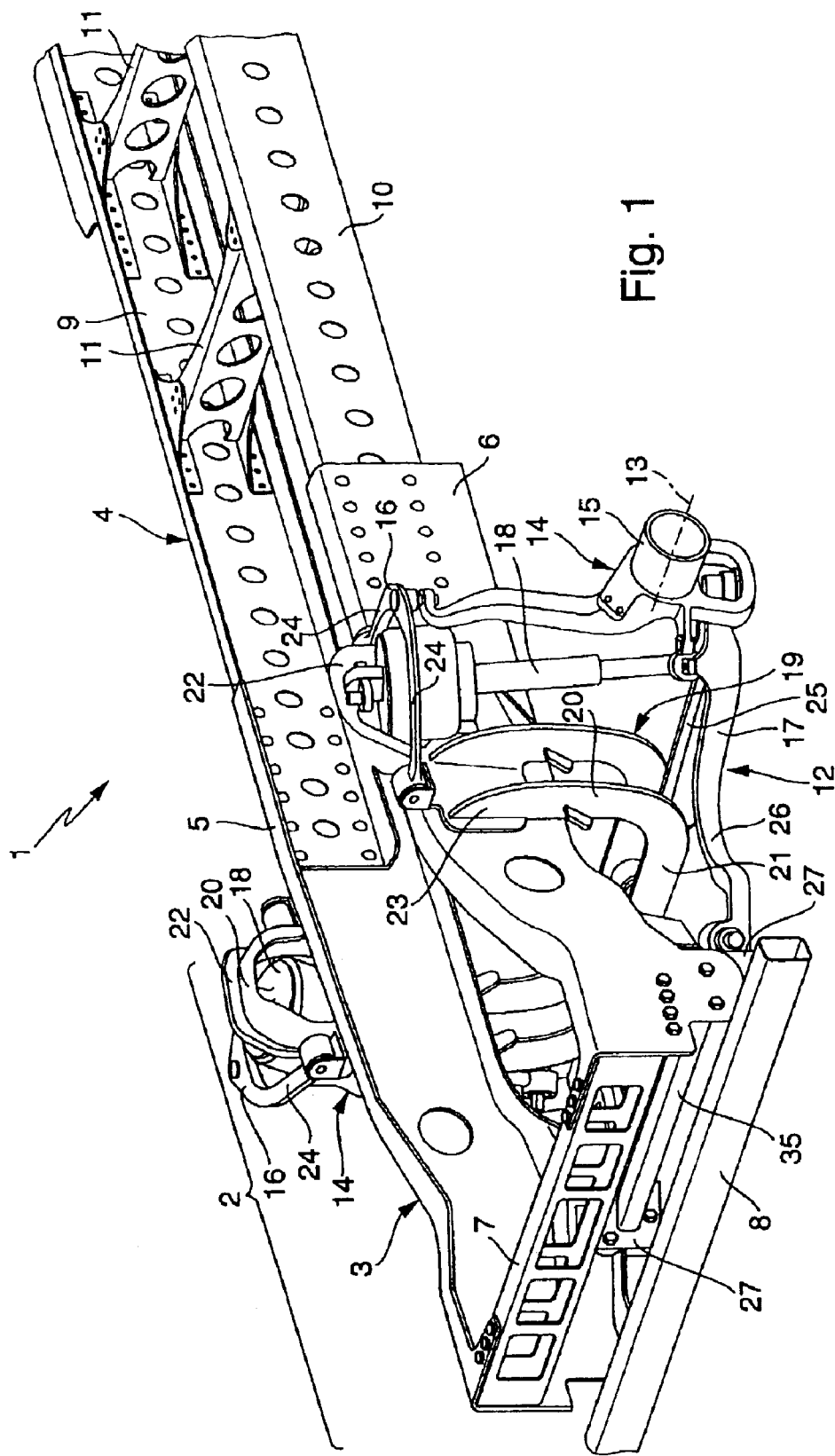
FIG. 1 shows a perspective view of a chassis according to the invention.

As shown in FIG. 1, a chassis 1 of a commercial vehicle (otherwise not shown), in particular a heavy-duty lorry, has, in a front region 2, which is indicated by a curly bracket, a front module 3 which is attached to the front end of a body supporting frame 4. The front module 3 has, on each side of the vehicle, a longitudinal member part 5, 6, the longitudinal member parts 5, 6 being connected to each other via a transverse member 7 on the end side. In the completed commercial vehicle, an internal combustion engine of the vehicle and a driver's cab are mounted on these longitudinal member parts 5, 6. Below the transverse member 7, a further transverse member 8, which is used as an underride protector, is attached to the front ends of the longitudinal member parts 5, 6.

The body supporting frame 4 basically comprises two body longitudinal members 9, 10 which are connected to each other via a plurality of transverse members 11. In the finished state of the vehicle, a vehicle body is mounted on these body longitudinal members 9, 10.

The longitudinal member parts 5, 6 of the front module 3 are connected fixedly at their rear ends to the front ends of the body longitudinal members 9, 10. The modular construction of the front module 3 makes it possible to construct the front module 3 and the body supporting frame 4 independently of each other in a preassembly context. In a subsequent final assembly, the subassemblies, which have been completed in themselves, i.e. the front module 3 and body supporting frame 4, can be put together.

The chassis 1 has, at least in the front region 2, an axle module 12 on which a front axle 13 of the vehicle is constructed. The axle module 12 has, on each side of the vehicle, an individual wheel suspension means 14 for the wheels (not shown) of the front axle 13. Each individual wheel suspension means 14 comprises a wheel carrier 15, an upper A-frame arm 16, a lower A-frame arm 17 and a suspension and/or shock-absorber strut 18.

The axle module 12 also has a U-shaped bracket 19 which comprises two U-limbs 20 and a U-base 21. In this case, the U-limbs 20 and the U-base 21 are in each case made in duplicate, with the sublimbs at the free ends of the U-limbs 20 being connected to one another in each case via a yoke 22. The U-base 21 connects the two U-limbs 20 to each other. The bracket 19 is orientated transversely with respect to the longitudinal direction of the vehicle, so that its U-base 21 extends transversely with respect to the longitudinal direction of the vehicle. The U-limbs 20 engage, on each side of the vehicle, around the respectively associated longitudinal member part 5 or 6 from below and from the outside. The bracket 19 is fastened at its U-limbs 20 to the respective longitudinal member part 5,6 in each case in a first coupling zone 23. The axle module 12 is therefore fastened to the front module 3 via the bracket 19.

The axle module 12 can be constructed independently of the front module 3 in a preassembly context. During the process of putting them together, the complete axle module 12 can then be attached to the front module 3.

Each upper A-frame arm 16 has two limbs 24 which are both mounted pivotably on the respectively associated U-limb 20 of the bracket 19. Each lower A-frame arm 17 has a first limb 25 and a second limb 26. The respective, lower A-frame arm 17 is mounted pivotably with the first limb 25 on the U-base 21 of the bracket 19 while it is mounted pivotably with its second limb 26 directly or indirectly on the respective longitudinal member part 5, 6, in each case in the region of a second coupling zone 27.

The wheels of the front axle 13 are mounted on the wheel carriers 15, each wheel carrier 15, for its part, being mounted on the A-frame arms 16, 17. The suspension and/or shock-absorber struts 18 are supported at one end on the lower A-frame arm 17 and at the other end on the yoke 22 of the U-limbs 20.

The suspension and/or shock-absorber struts 18 can operate, for example, hydraulically and/or pneumatically. A suspension and/or shock-absorber strut 18 of this type is conventionally used to realize, for the respective vehicle wheel, a compression travel and a rebound travel which together form an overall suspension travel. An active suspension and/or shock-absorber strut 18 can, for example, be used to vary the overall suspension travel. In addition or as an alternative, an active suspension and/or shock-absorber strut 18 can, for example, be used to vary the ratio of compression travel to rebound travel, the ratio being 0% to 100% in an extreme case.

With the aid of active suspension and/or shock-absorber struts 18 of this type, it is possible, in particular, to change the vertical ground clearance of the vehicle in a specific manner. For example, the ground clearance can be increased by increasing the compression travel. In this manner, in the case of a construction-site vehicle, for example, the ground clearance can be increased for operation on the construction site and reduced for operation on the road. In an extreme case, for example for travelling over obstacles—expediently at walking speed—the rebound travel can be reduced to zero in order to achieve a maximum ground clearance.

According to FIGS. 2A and 2B, the first coupling zone 23 and the second coupling zone 27 are prepared and designed in each case for at least two coupling configurations, in which the axle module 12 can be attached to the front module 3. FIGS. 2A and 2B reproduce two different attachments or coupling configurations between the axle module and front module 3. These two coupling configurations differ through the ground clearance produced here for the longitudinal member parts 5 and 6 in the vertical direction.

In the configuration shown in FIG. 2A, the U-limbs 20 of the bracket 19 are fastened to the longitudinal member parts 5, 6 in a lower position in the first coupling zones 23. In a corresponding manner, the second limb 26 of the lower A-frame arm 17 is also fastened, on each side of the vehicle, to the respective longitudinal member part 5, 6 in a lower position in the second coupling zone 27. In the embodiment shown here, the lower A-frame arm 17 is fastened to the longitudinal member part 5, 6 indirectly via a support plate 28 which, for its part, is fastened to the respective longitudinal member part 5, 6. In this configuration, the front axle 13 is at a relatively great distance A from a lower edge 29 of the respective longitudinal member part 6. Accordingly, the longitudinal member parts 5, 6 and the complete chassis 1 also have a relatively large vertical ground clearance. Since the selected coupling configuration determines the distance from the ground of the complete front module 3, an increased ground clearance is associated automatically with an increase in the overhang angle of the chassis 1 or of the vehicle provided with it.

In contrast to this, in the case of the second coupling configuration illustrated in FIG. 2B, the axle module 12 is fastened to the front module 3 at a relatively high point. Accordingly, the U-limbs 20 are fastened to the respective longitudinal member parts 5, 6 in an upper position in the first coupling zone 23. Similarly, in the case of the lower A-frame arms 17, the second limbs 26 are in each case fastened to the respective longitudinal member part 6 in a lower position in the second coupling zone 27.

In this embodiment, the second limb 26 is fastened directly to the longitudinal member part 6. Since, according to FIG. 2B, the axle module 12 is fastened to the front module 3 at a higher point, a distance B is produced between the front axle 13 and the lower edge 29 of the longitudinal member parts 5, 6, the distance being noticeably smaller than the distance A in the case of the configuration according to FIG. 2A. The ground clearance of the longitudinal member parts 5, 6 or of the chassis 1 and the overhang angle of the vehicle are also reduced in a corresponding manner.

In the case of the preferred embodiment shown here, the U-limbs 20 are fastened to the respective longitudinal member parts 5, 6 by way of a first bolted connection 30. In order to provide the two coupling configurations, the first coupling zones 23 are provided in each case with a first hole pattern 31 which has a grid-type structure, with the aid of which the desired coupling configurations can be realized.

In a corresponding manner, the second limb 26 of the lower A-frame arm 16 is fastened here to the respective longitudinal member part 5, 6 by way of a second bolted connection 32. In this case, this bolted connection 32 is formed on a bearing 33 of the second limb 26. In order to provide the desired coupling configurations, the second coupling zones 27 have a second hole pattern 34 which is formed in a grid corresponding to the desired coupling configurations.

With reference to FIG. 1, a particularly advantageous variant of the chassis 1 can have, in the region of the second coupling zones 27, a transverse supporting member 35 which extends between the longitudinal member parts 5, 6 of the front module 3 and via which the two opposite, second coupling zones 27 are supported on each other transversely with respect to the longitudinal direction of the vehicle. Accordingly, the second limbs 26 of the lower A-frame arms 17 are also supported on each other transversely with respect to the longitudinal direction of the vehicle via this transverse supporting member 35. The integration of this transverse supporting member 35 increases the stability and rigidity of the front module 3, as a result of which the functional reliability of the individual wheel suspension means 14 is increased.

According to FIGS. 3A and 3B, a respective third coupling zone 36 is formed for the attachment of the body longitudinal members 9, 10 to the longitudinal member parts 5, 6 of the front module 3, these third coupling zones 36 likewise being prepared for at least two coupling configurations. The longitudinal member parts 5, 6 are expediently fastened to the body longitudinal members 9, 10 by way of a third bolted connection 37, with the third coupling zone 36 for this third bolted connection 37 in each case having a third hole pattern 38. This third hole pattern 38 has, for its part, a grid-type structure which is matched to the desired configurations for the connection or coupling between body longitudinal members 9, 10 and longitudinal member parts 5, 6.

In the case of the coupling configuration shown in FIG. 3A, the body longitudinal member 10 which is shown is fastened to the respective longitudinal member part 6 at a relatively high point in the third coupling zone 36. This results in a distance C between the lower side 29 of the longitudinal member part 6 and the lower side 39 of the body longitudinal member 10. In the case of this configuration, the chassis 1 has a relatively high ground clearance in the region of the body supporting frame 4.

In the case of the configuration according to FIG. 3B, the body longitudinal member 10 which is shown is fastened to the associated longitudinal member part 6 at a relatively low point in the third coupling zone 36. In this configuration, the distance C between the lower sides 29 and 39 of the longitudinal member part 6 and of the body longitudinal member 10, respectively, is virtually eliminated. Accordingly, in the case of this configuration, the ground clearance of the body supporting frame 4 is reduced. However, this second configuration according to FIG. 3B provides the option of constructing the body of the commercial vehicle provided with it such that it is higher and therefore has a larger loading capacity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A chassis for a commercial vehicle, comprising:
   a front module which has, on each side of the vehicle, a longitudinal member part, the parts being connected to each other via at least one transverse member and usable as a mounting for an internal combustion engine or a driver's cab,
   an axle module which has a U-shaped bracket which engages around the longitudinal member parts from below and from an outside and which is fastened by U-limbs to the outside of the longitudinal member parts on each side of the vehicle, in each case, in a first coupling zone of the longitudinal member parts, the axle module having, on each side of the vehicle, an individual wheel suspension, in which, in each case, one wheel carrier is mounted on the axle module via a lower A-frame arm and an upper A-frame arm, each said lower A-frame arm being mounted with a first limb on a U-base of the bracket, said U-base connecting the U-limbs to each other, and being mounted with a second limb on the longitudinal member part in a second coupling zone of the respective longitudinal member part, each said upper A-frame arm being mounted with both limbs on one of the U-limbs of the bracket, both of the first coupling zones and the second coupling zones being designed for at least two coupling configurations, in which the bracket is attachable in the first coupling zones and the second limbs of the lower A-frame arms are attachable in the second coupling zones, the at least two coupling configurations differing from one another with regard to the vertical ground clearance of the longitudinal member parts.

2. The chassis according to claim 1, wherein the axle module forms a unit which is preassemblable independently of the front module and, for attachment to the front module, is connected to the longitudinal member parts in one of the coupling configurations in the first coupling zones and the second coupling zones.

3. The chassis according to claim 1, wherein the U-limbs are fastened in the first coupling zones by way of a first bolted connection.

4. The chassis according to claim 2, wherein the U-limbs are fastened in the first coupling zones by way of a first bolted connection.

5. The chassis according to claim 3, wherein the first coupling zones each have a first hole pattern for forming the first bolted connection, the pattern being formed in a grid corresponding, in each case to, the coupling configurations.

6. The chassis according to claim 1, wherein the second limbs of the lower A-frame arms each have a bearing which is fastened in the respective, second coupling zone by way of a second bolted connection.

7. The chassis according to claim 2, wherein the second limbs of the lower A-frame arms each have a bearing which is fastened in the respective, second coupling zone by way of a second bolted connection.

8. The chassis according to claim 3, wherein the second limbs of the lower A-frame arms each have a bearing which is fastened in the respective, second coupling zone by way of a second bolted connection.

9. The chassis according to claim 5, wherein the second limbs of the lower A-frame arms each have a bearing which is fastened in the respective, second coupling zone by way of a second bolted connection.

10. The chassis according to claim 6, wherein the second coupling zones each have a second hole pattern for forming the second bolted connection, the pattern being formed in a grid corresponding, in each case to, the coupling configurations.

11. The chassis according to claim 1, wherein the longitudinal member parts are supported on each other in a region of the second coupling zones via a transverse supporting member which is positioned in such a manner that the second limbs of the lower A-frame arms are supported on one another transversely with respect to the longitudinal direction of the vehicle via the transverse supporting members.

12. The chassis according to claim 2, wherein the longitudinal member parts are supported on each other in a region of the second coupling zones via a transverse supporting member which is positioned in such a manner that the second limbs of the lower A-frame arms are supported on one another transversely with respect to the longitudinal direction of the vehicle via the transverse supporting members.

13. The chassis according to claim 3, wherein the longitudinal member parts are supported on each other in a region of the second coupling zones via a transverse supporting member which is positioned in such a manner that the second limbs of the lower A-frame arms are supported on one another transversely with respect to the longitudinal direction of the vehicle via the transverse supporting members.

14. The chassis according to claim 11, wherein the second limbs of the lower A-frame arms are fastened, at least in one of the coupling configurations, directly to the transverse supporting members which are fastened to the longitudinal member parts.

15. The chassis according to claim 1, wherein the axle module has, on each side of the vehicle, a suspension or shock-absorber strut which is supported in each case at one end on the U-limb of the bracket and at the other end on the wheel carrier or on the lower A-frame arm.

16. The chassis according to claim 1, wherein the longitudinal member parts of the front module each have a third coupling zone in which body longitudinal members are fastened, the body longitudinal members being capable of supporting a vehicle body.

17. The chassis according to claim 16, wherein the third coupling zones are designed for at least two further coupling configurations, in which the body longitudinal members are fastenable to the longitudinal member parts in the third coupling zones, and which differ from one another with regard to the vertical ground clearance of the body longitudinal members.

18. The chassis according to claim 17, wherein the body longitudinal members are fastened to the longitudinal member parts by way of a third bolted connection, the third coupling zones each having a third hole pattern for forming the third bolted connection, the pattern being formed in a grid corresponding in each case to the further coupling configurations.

19. A chassis assembly for a commercial vehicle, comprising:

a forward module having two laterally spaced longitudinal parts which are connected to one another by a transverse member, the longitudinal parts being adapted for mounting an engine or cab, an axle module having a bracket which is fastened to the longitudinal parts from an outside of each side of the vehicle at first coupling zones on the longitudinal parts, the axle module including, on each side of the vehicle, a wheel suspension, each of the wheel suspensions being mounted on the bracket and on the respective longitudinal part at a second coupling zone on each of the longitudinal parts, the first and second coupling zones having at least two coupling configurations each, the configurations differing from one another based upon a vertical ground clearance of the longitudinal parts.

* * * * *